United States Patent [19]

Foote

[11] Patent Number: 4,487,134
[45] Date of Patent: Dec. 11, 1984

[54] PORTABLE WORKTABLE

[76] Inventor: Daniel J. Foote, 7323 Wellauer Dr., Wauwatosa, Wis. 53213

[21] Appl. No.: 404,363

[22] Filed: Aug. 2, 1982

[51] Int. Cl.³ .............................................. A47B 23/00
[52] U.S. Cl. ............................... 108/44; 280/33.99 A; 312/250
[58] Field of Search ........ 280/DIG. 4, 289 A, 289 R, 280/33.99 A, 33.99 R, 727; 108/44; 312/250

[56] References Cited

U.S. PATENT DOCUMENTS

| | | | |
|---|---|---|---|
| 2,831,599 | 4/1958 | Graffeo | 280/33.99 A |
| 3,534,973 | 10/1970 | Elliott | 280/33.99 A |
| 3,868,123 | 2/1975 | Berg et al. | 312/250 |
| 4,032,164 | 6/1977 | Frisch | 280/33.99 A |
| 4,081,205 | 3/1978 | Rosenacker | 312/250 |
| 4,274,567 | 6/1981 | Sawyer | 280/33.99 A |

FOREIGN PATENT DOCUMENTS

| | | | |
|---|---|---|---|
| 1416622 | 9/1965 | France | 108/44 |
| 8006282 | 6/1982 | Netherlands | 280/33.99 A |
| 1122364 | 8/1968 | United Kingdom | 108/44 |

Primary Examiner—James T. McCall
Attorney, Agent, or Firm—Andrus, Sceales, Starke & Sawall

[57] ABSTRACT

A device for use with a shopping cart to provide a portable worktable includes a flat table member supportable by the sides of the cart and positionable to substantially cover the open top of a shopping cart, and a plurality of legs for removably retaining the table member on the cart. The legs includes a pair of rear and a front retaining member depending from the bottom of the table member. The stop members are disposed in spaced relation to one another and are engagable with the sides of the cart to prevent width-wise shifting of the table. The front retaining member includes a channel-shaped opening that receives the upper rail of the front of the cart to prevent length-wise shifting of the table.

5 Claims, 3 Drawing Figures

PORTABLE WORKTABLE

BACKGROUND OF THE INVENTION

The present invention relates to portable worktables, and more particularly to a device for use with a shopping cart to provide a portable worktable.

In retail stores, such as grocery stores and department stores, it is necessary to take inventory, restock merchandise on display shelves, display the price on each item of merchandise, and from time to time adjust the price of such merchandise. In order to accomplish this it is desirable to provide a worktable which could be utilized for writing, and supporting price catalogs, pencils and other tools. Since shopping carts are generally readily available in such stores, it would further be desirable to provide a device which could convert a shopping cart into a portable worktable.

SUMMARY OF THE INVENTION

A device for use with a shopping cart to provide a portable worktable includes a table member having a work surface, and means for removably retaining the table member on the cart.

The table member has a width and length of sufficient dimensions to substantially cover the open top of a cart. In one form, the table member is flat and rectangular in shape with a width slightly greater than the width of the shopping cart so that the underside of the table is engagable with and supportable by the sides of the shopping cart. The length of the table is less than the length of the open top of the cart. This dimension permits access to the interior of the cart's basket when the table is positioned on the cart for storage or refuse.

The retaining means includes front and rear legs which depend from the underside of the table member. The rear legs include a pair of stop members which are engagable with the sides of the shopping cart. The stop members are positioned in spaced relation to one another to prevent widthwise shifting of the table member when positioned on a shopping cart. The front legs include a retaining member which includes a channel-shaped opening for receiving the upper rail of the front of the cart to prevent lengthwise shifting of the table when the table is positioned on a cart.

The table member may also include a flange member extending along one of its edges to prevent tools and other materials from rolling off the work surface. A hole may also be formed along one of the edge margins of the table member to accommodate a pricing gun or other tool. The hole may also be utilized to hang the table on a wall when not in use.

The device of the present invention may also be utilized to convert a shopping cart into a portable display for various merchandise.

The present invention thus provides a device for converting a standard shopping cart into a portable worktable or display area. The device is handy, easy to use, and simple in design.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
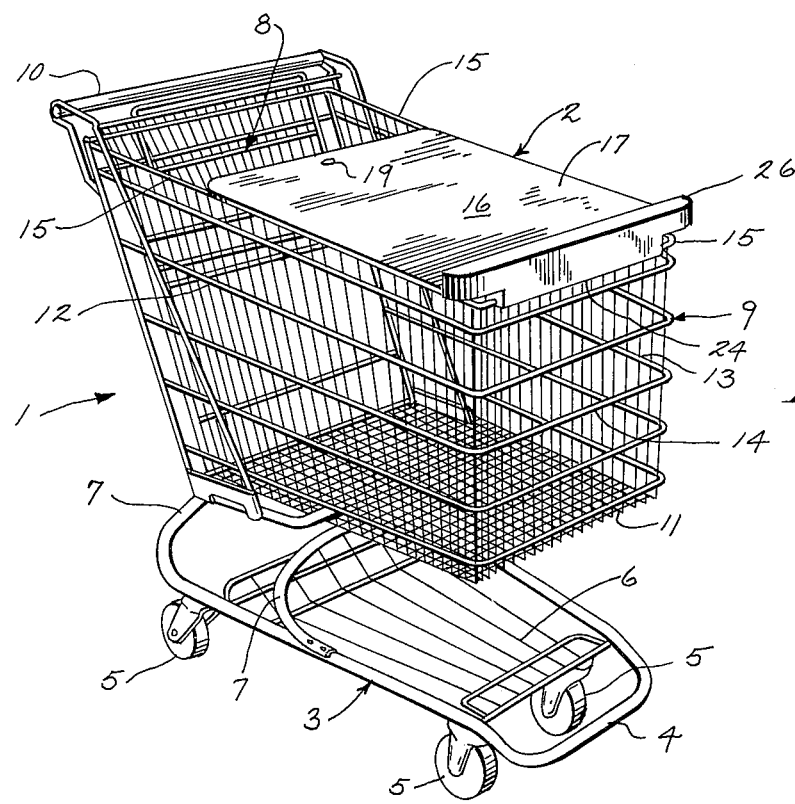
FIG. 1 is a view in perspective of the device of the present invention positioned on a conventional shopping cart.

Referring now to the drawings, FIG. 1 shows a conventional shopping cart 1 incorporating the removable table top 2 of the present invention. Although the table top 2 may be used with various types of shopping carts, the shopping cart 1 illustrated in FIG. 1 is typical of those found in grocery stores and department stores and used by customers to load and transport articles to a checkout counter. The cart 1 includes a framework 3 preferably constructed of metal tubing that includes a U-shaped base member 4 which is supported by casters 5 at its front and rear ends. A shelf 6 of rod and wire mesh may be provided on the base member 4 for carrying relatively large goods. The framework 3 also includes a pair of upright tubes 7 fixed to the base member 4 for supporting a basket assembly at their upper ends.

The basket assembly is generally comprised of a cage-like mesh of vertically and horizontally disposed metal rods and wires mounted on the frame 3 for receiving and loading goods. The basket includes a pivotal auxiliary basket or infant seat portion 8 at the rear of cart 1 and a fixed main basket portion 9 at the front of cart 1. The auxiliary basket 8 is pivotable between opened and closed positions and is shown in FIG. 1 in its closed position. The auxiliary basket 8 is also pivotable upwardly to a substantially horizontal position to permit the front of one cart to be inserted to the rear of a second cart in a nesting arrangement for storage, as is conventionally known. The auxiliary basket portion 8 is generally used to hold smaller items, but if desired may be used as an infant seat, as is also conventionally known. A handle 10 is spaced rearwardly from the auxiliary basket portion 8 for enabling a customer to move the cart 1 from place to place.

The main basket portion 9 includes a bottom wall 11, side walls 12 and 13 and front wall 14 which define a goods-receiving storage area. A U-shaped rod member 15 generally defines the top edge of walls 12–14 of the main basket portion 9.

The cart 1, to the extent described above, is well known in the art and is of the type conventionally used in grocery stores and department stores. It should be noted, however, that the present invention may be utilized with carts of various designs. For example, the table top 2 of the present invention may be utilized with carts having a fixed auxiliary basket portion at the rear of the cart and a pivotable main basket portion at the front of the cart. In such carts, the main basket portion is pivotable on a substantially horizontal, transverse axis between a use position and an upright storage position. When the main basket is in its goods-receiving or use position, it extends forwardly from the fixed auxiliary basket portion. However, the main basket portion can also be pivoted upwardly to a storage or nesting position where it is substantially vertically upward. Thus, the present invention is not limited to a cart of the specific structure shown in FIG. 1, but is adaptable to be utilized with carts of various designs.

Figure 2:
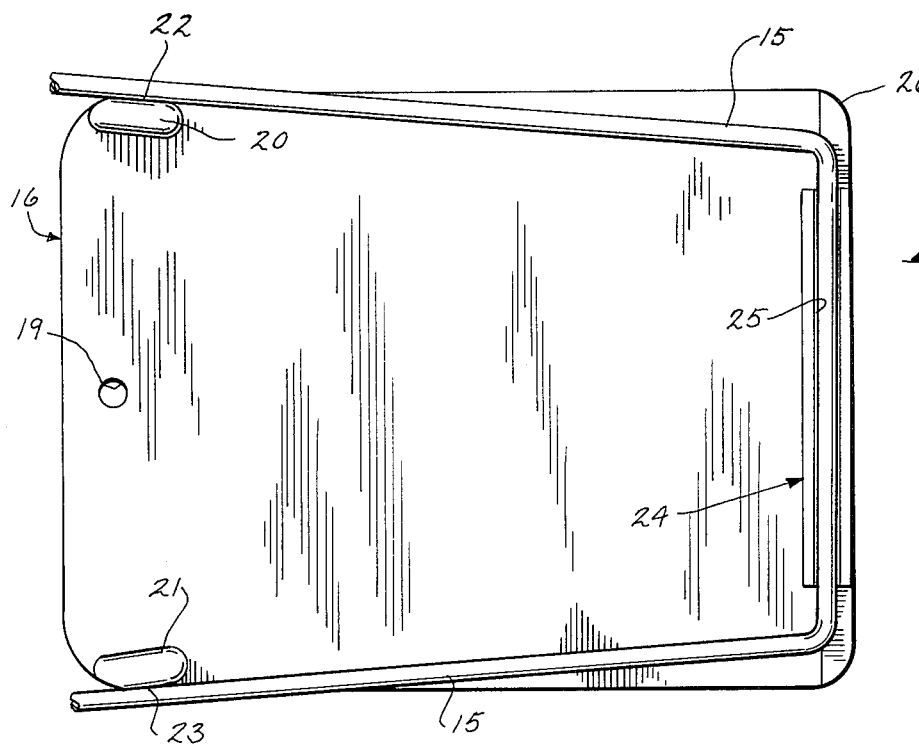
FIG. 2 is a plan view of the underside of the device showing the manner in which the device is removably retained on the shopping cart.
Figure 3:
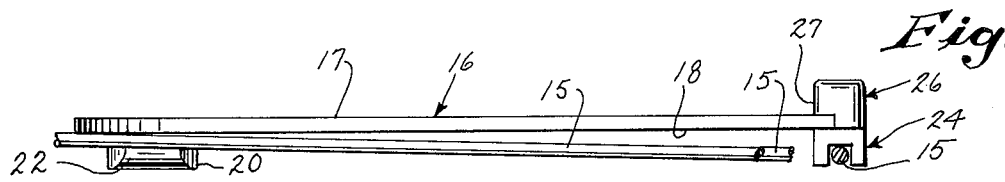
FIG. 3 is a side view in elevation with parts broken away of the device as shown in FIG. 2.

As a unique feature, FIGS. 1–3 show the table top 2 of the present invention. The table top 2 includes a table member 16 and means for removably retaining the table member 16 on cart 1. The table member 16 is flat and rectangular in shape with its width being less than its length as shown in FIG. 2. The table member 16 has a top surface which defines a planar work surface 17, and a bottom surface 18 which faces the goods-receiving storage area of the main basket 9 of the cart 1 when the table top 2 is positioned thereon. As shown in FIG. 2, the width of the table member 16 is the same along its entire length and thus the front of member 16 extends beyond or overhangs rod member 15. The length of table member 16 is less than the length of the open top of cart 1 so as to permit access to the interior of the main basket 9 of the cart 1. Thus, the main basket portion 9 may be utilized for storage or refuse even when the table member 16 is positioned on cart 1. However, as shown in FIG. 1 the width and length of table member 16 is sufficient to substantially cover all of the open top of cart 1.

Table member 16 also includes a hole 19 formed therethrough adjacent its rear edge as shown in FIGS. 1 and 2. The hole 19 may be utilized to accommodate various tools, such as a pricing gun. A pricing gun is a hand held tool commonly used to place small stickers having a price thereon onto the package of an item and generally includes a handle having a trigger member. The handle of such a tool is insertable into the hole 19. The hole 19 may also be utilized to hang the table top 2 on a hook against a wall when not in use on the shopping cart 1.

The retaining means of table top 2 includes front and rear legs depending from bottom surface 18 of table member 16. The rear legs include a pair of stop members 20 and 21 engagable with sides 12 and 13, respectively, of cart 1. As seen best in FIG. 2 the side-engaging stop members 20 and 21 are positioned adjacent the rear edges of table member 16. When the table top 2 is positioned on cart 1, as shown in FIG. 1, the stop members 20 and 21 extend downwardly into the goods-receiving chamber of the main basket portion 9 of cart 1 so that their outer surfaces 22 and 23, respectively, engage the inside of rod member 15, as seen best in FIG. 2. The stop members 20 and 21 are disposed at an angle to the side edges of table member 16 in order to accommodate the angle of rod member 15 and the sides 12 and 13 of cart 1 since the cart 1 is generally narrower at its front than at its rear. As seen best in FIG. 2, stop members 20 and 21 will engage the side walls 12 and 13 of cart 1 in order to prevent widthwise shifting of the table member 16 when the table member 16 is positioned on the cart 1. While stop members 20 and 21 are shown fixed in place, they may be adjustably mounted to table member 16 so that the invention may be used with shopping carts of various sizes.

The retaining means further includes a front leg comprising a retaining member 24 which also depends from the bottom surface 18 of table member 16, as seen best in FIG. 3. The retaining member 24 is engagable with the front wall 14 of cart 1, and includes a channel-shaped opening 25 extending widthwise along the front edge of table member 16. The channel-shaped opening 25 is of sufficient depth to receive the rod member 15 and thus prevents lengthwise shifting of table member 16 when table member 16 is positioned on cart 1.

As seen best in FIGS. 1 and 3, the table top 2 also includes a flange member 26 projecting upwardly from work surface 17. Flange member 26 extends widthwise across the front end of table member 16 and includes an abutment surface 27. The abutment surface 27 extends substantially normal to work surface 17 and functions to prevent tools, pencils and the like from rolling off work surface 17. Flange member 26 and retaining member 24 may either be integrally formed in one piece or may be formed in separate pieces. Flange member 26 and retaining member 24 preferably are secured to the front end of table member 16 by adhesives or by fastening devices, such as nails, screws and the like.

A portable work table has been shown and described herein. It is readily obvious to those skilled in the art that various modifications may be made to the specific structure shown and described herein. For example, various means for removably attaching the table member 16 to the shopping cart 1 may be utilized, such as various well known snap-on devices. In addition, table member 16 and work surface 17 may not be flat as shown but could be elevated off of the top of cart 1 depending upon the desired use. Further, the work table could also function as a portable display to display merchandise. Table member 16 also provides a flat, elevated surface that facilitates the transfer of case goods or heavy items, in that these items need not be lifted in and out of the bottom of the cart.

Various modes of carrying out the invention are contemplated as being within the scope of the following claims particularly pointing out and distinctly claiming the subject matter which is regarded as the invention.

I claim:

1. A device for use with a shopping cart to provide a portable worktable, comprising:

a flat table member having a planar work surface supportable by the side and front walls of a shopping cart, said table member having a width and length sufficient to substantially cover the open top of a cart; and means on said table member for removably retaining said table member on a cart, said retaining means includes a pair of stop members engageable with the walls of a shopping cart which depend from the undersurface of said table member and are in spaced relation to one another adjacent opposite side edges of said table member, said stop members being positioned to butt against the side walls of a cart to prevent widthwise shifting of said table member when the table member is positioned on a cart and further includes a retaining member which depends from the undersurface of said table member adjacent its front edge and is engageable with the front wall of a shopping cart, said retaining member includes a channel-shaped opening extending widthwise of said table member for receiving the upper end of the front wall of the cart to prevent lengthwise shifting of said table member when the table member is positioned on a cart, said channel-shaped opening being spaced from the undersurface of said table member to elevate the front of said table member so that said work surface is in a substantially horizontal position.

2. In combination, a shopping cart having a basket with a front wall, a pair of opposite side walls and an open top, a flat table member having a planar work surface supportable by the side and front walls of the shopping cart, said table member having a width and length sufficient to substantially cover the open top of the cart; and means on said table member for removably retaining said table member on the cart, said retaining means includes a pair of stop members engageable with the walls of the shopping cart which depend from the undersurface of said table member and are in spaced relation to one another adjacent opposite side edges of said table member, said stop members being positioned to butt against the side walls of the cart to prevent widthwise shifting of said table member when the table member is positioned on the cart and further includes a retaining member which depends from the undersurface of said table member adjacent its front edge and is engageable with the front wall of the shopping cart, said retaining member includes a channel-shaped opening extending widthwise of said table member for receiving the upper end of the front wall of the cart to prevent lengthwise shifting of said table member when the table member is positioned on the cart, said channel-shaped opening being spaced from the undersurface of said table member to elevate the front of said table member so that said work surface is in a substantially horizontal position.

3. The device of claim 1, wherein said table member further includes a flange member extending upwardly across the front end of said work surface to prevent tools and the like from rolling off said surface.

4. The device of claim 1, wherein said table member includes a hole formed therethrough along its edge margin.

5. The device of claim 1, wherein the length of said table member is less than the length of the open top of said cart to permit access to the interior of the basket of the cart when the table member is positioned on a cart.

* * * * *